United States Patent
Li et al.

(10) Patent No.: US 12,075,118 B2
(45) Date of Patent: Aug. 27, 2024

(54) MULTIMEDIA DATA PROCESSING METHOD, APPARATUS AND ELECTRONIC DEVICE

(71) Applicant: BEIJING BYTEDANCE NETWORK TECHNOLOGY CO., LTD., Beijing (CN)

(72) Inventors: Jiajia Li, Beijing (CN); Mingyuan Li, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 288 days.

(21) Appl. No.: 17/529,159

(22) Filed: Nov. 17, 2021

(65) Prior Publication Data

US 2022/0182717 A1  Jun. 9, 2022

(30) Foreign Application Priority Data

Dec. 8, 2020  (CN) .......................... 202011447068.6

(51) Int. Cl.
  *H04N 21/44*  (2011.01)
  *H04N 21/442*  (2011.01)
  *H04N 21/4627*  (2011.01)
  *H04N 21/462*  (2011.01)

(52) U.S. Cl.
  CPC ... *H04N 21/44213* (2013.01); *H04N 21/4627* (2013.01)

(58) Field of Classification Search
  USPC ....................................................... 386/343
  See application file for complete search history.

(56) References Cited

U.S. PATENT DOCUMENTS

| | | | |
|---|---|---|---|
| 9,100,629 B1* | 8/2015 | Brenden | G06F 3/14 |
| 9,322,535 B1* | 4/2016 | Al Rasheed | G02C 11/04 |
| 9,662,565 B1* | 5/2017 | Riordan | A63F 13/80 |
| 9,916,077 B1* | 3/2018 | Lewis | H04N 21/23424 |
| 10,129,937 B1* | 11/2018 | Lin | H05B 45/335 |
| 10,147,461 B1* | 12/2018 | Bates | H04N 21/435 |

(Continued)

FOREIGN PATENT DOCUMENTS

| | | |
|---|---|---|
| CN | 105120351 A | 12/2015 |
| CN | 105683812 A | 6/2016 |

(Continued)

OTHER PUBLICATIONS

First Office Action issued Feb. 14, 2022 in Chinese Patent Application No. 202011447068.6 (11 pages) with an English translation (11 pages).

(Continued)

*Primary Examiner* — Nigar Chowdhury

(57) ABSTRACT

The present disclosure provides a multimedia data processing method, apparatus, and electronic device, the method is performed by a terminal device, in operation, whether or not a shield instruction for playing multimedia data is received is detected, and the shield instruction indicates that the target parameters meet the preset conditions. Multimedia data is shielded. If the shield instruction is received, the target parameters in the multimedia data to be played are detected. If the target parameters in the multimedia data to be played meet the preset conditions, the multimedia data to be played is shielded.

20 Claims, 8 Drawing Sheets

(56) References Cited

U.S. PATENT DOCUMENTS

| | | | |
|---|---|---|---|
| 10,257,547 B1* | 4/2019 | Yan | H04N 21/47217 |
| 2006/0192847 A1* | 8/2006 | Watanabe | H04N 7/142 |
| | | | 348/E7.079 |
| 2007/0126757 A1* | 6/2007 | Itoh | G09G 3/342 |
| | | | 345/690 |
| 2007/0236432 A1* | 10/2007 | Benjamin | G09G 3/3648 |
| | | | 345/87 |
| 2008/0242588 A1* | 10/2008 | Xiong | C40B 30/06 |
| | | | 435/29 |
| 2011/0169929 A1* | 7/2011 | Miyazaki | H04N 13/00 |
| | | | 348/58 |
| 2011/0229862 A1* | 9/2011 | Parikh | G09B 5/067 |
| | | | 434/156 |
| 2012/0105812 A1* | 5/2012 | Dekker | H04N 9/3129 |
| | | | 353/121 |
| 2014/0058483 A1* | 2/2014 | Zao | A61N 5/06 |
| | | | 607/88 |
| 2014/0150012 A1* | 5/2014 | Mountain | H04N 21/4312 |
| | | | 725/32 |
| 2014/0256250 A1* | 9/2014 | Cueto | H04B 5/0031 |
| | | | 455/41.1 |
| 2015/0033023 A1* | 1/2015 | Xu | H04N 21/8355 |
| | | | 713/176 |
| 2015/0278534 A1* | 10/2015 | Thiyagarajan | G06F 21/84 |
| | | | 726/28 |
| 2016/0056199 A1 | 2/2016 | Kim et al. | |
| 2016/0080510 A1* | 3/2016 | Dawoud Shenouda Dawoud | |
| | | | H04N 21/42201 |
| | | | 709/225 |
| 2016/0104035 A1* | 4/2016 | Wang | G06V 20/52 |
| | | | 382/118 |
| 2016/0178904 A1* | 6/2016 | Deleeuw | H04N 13/366 |
| | | | 345/8 |
| 2016/0294799 A1* | 10/2016 | Miller | H04N 21/43072 |
| 2016/0294894 A1* | 10/2016 | Miller | G06F 16/24578 |
| 2016/0337368 A1* | 11/2016 | D'Egidio | H04L 63/102 |
| 2017/0062005 A1* | 3/2017 | Kolesnikov | H04N 5/76 |
| 2017/0104285 A1* | 4/2017 | Yoshioka | H01R 12/7088 |
| 2017/0255830 A1* | 9/2017 | Chen | G06V 20/41 |
| 2017/0289624 A1 | 10/2017 | Avila et al. | |
| 2017/0345420 A1* | 11/2017 | Barnett, Jr. | G10L 15/1815 |
| 2018/0088669 A1 | 3/2018 | Ramaprakash et al. | |
| 2018/0176748 A1* | 6/2018 | Kim | H04L 67/34 |
| 2018/0310042 A1* | 10/2018 | Mayalil | H04N 21/41407 |
| 2018/0315363 A1* | 11/2018 | Abbott | G09G 5/003 |
| 2018/0336692 A1* | 11/2018 | Wendel | G06T 7/593 |
| 2018/0338104 A1 | 11/2018 | Pines et al. | |
| 2019/0253757 A1 | 8/2019 | Leister | |
| 2020/0005414 A1* | 1/2020 | Matsumoto | G06Q 20/386 |
| 2020/0021718 A1* | 1/2020 | Barbu | A61B 5/7267 |
| 2020/0137347 A1 | 4/2020 | Rechner et al. | |
| 2020/0366959 A1 | 11/2020 | Pau et al. | |
| 2021/0271124 A1* | 9/2021 | Peso | A61M 21/02 |
| 2021/0274084 A1* | 9/2021 | Hejl | H04N 25/53 |
| 2022/0103675 A1* | 3/2022 | Hulbert | G06Q 20/40145 |

FOREIGN PATENT DOCUMENTS

| | | |
|---|---|---|
| CN | 105812921 A | 7/2016 |
| CN | 106055996 A | 10/2016 |
| CN | 106155691 A | 11/2016 |
| CN | 108600787 A | 9/2018 |
| CN | 108701438 A | 10/2018 |
| CN | 109089142 A | 12/2018 |
| CN | 109644297 A | 4/2019 |
| CN | 109729369 A | 5/2019 |
| CN | 110472074 A | 11/2019 |
| CN | 111866592 A | 10/2020 |
| CN | 112584243 A | 3/2021 |
| JP | 2018-042021 A | 3/2018 |
| JP | 2019-110396 A | 7/2019 |
| KR | 10-2016-0023218 A | 3/2016 |

OTHER PUBLICATIONS

European Search Report for EP Patent Application No. 21902258, Issued on Jan. 5, 2024, 6 pages.

Office action received from Japanese patent application No. 2023-532672 mailed on May 28, 2024, 16 pages (8 pages English Translation and 8 pages Original Copy).

\* cited by examiner

MULTIMEDIA DATA PROCESSING METHOD, APPARATUS AND ELECTRONIC DEVICE

CROSS-REFERENCE TO RELATED APPLICATION

The present disclosure is based on and claims priority to China Patent Application No. 202011447068.6 filed on Dec. 8, 2020, the disclosure of which is incorporated by reference herein in its entirety.

FIELD OF THE INVENTION

Embodiments of the present disclosure relate to the field of data processing, and more particularly to a multimedia data processing method, apparatus, and electronic device.

BACKGROUND

With the development of Internet technology, terminal devices are populated increasingly in users, more and more applications, referred to as APPs, run on the terminal devices, and users can watch video, browse news, or listen to music, etc. by means of applications deployed on terminal devices.

Currently, when users are viewing multimedia data such as watching video, browsing news, or listening to music, etc. by means of applications deployed on terminal devices, physical discomfort may be induced for a user due to user's own genetic factors when the user is viewing some specific multimedia data. For example, the user may feel physically discomfortable due to flicker frequency of a video when the user is watching the video.

However, in the prior art, for the above problems, the damage that may be caused by multimedia data may be notified to the user only in a manner of alarm prompt, and the user still needs to manually select the multimedia data or continue to view the multimedia data, and all the above steps shall be repeated for each kind of multimedia data that may cause user's physical discomfort, the operation is cumbersome, affects the user's experience seriously and may bring damage to the user.

DISCLOSURE OF THE INVENTION

Embodiments of the present disclosure provide a multimedia data processing method, apparatus, and electronic device, which can solve the problem in the prior art in which for each kind of multimedia data that may cause user's physical discomfort, separate notification shall be made, the user's experience may be affected seriously and the user may be damaged.

In a first aspect, the present disclosure provides a multimedia data processing method, executable by a terminal device, including:
  detecting whether a shield instruction for multimedia data playing is received, wherein the shield instruction indicates that a shield processing is performed on multimedia data whose target parameter satisfies a preset condition;
  if the shield instruction is received, detecting the target parameter in the multimedia data to be played, and if the target parameter in the multimedia data to be played satisfies the preset condition, performing the shield processing on the multimedia data to be played.

In a second aspect, the present disclosure provides a multimedia data processing apparatus, including:
  a detection module for detecting whether a shield instruction for multimedia data playing is received, wherein the shield instruction indicates that a shield processing is performed on multimedia data whose target parameter satisfies a preset condition; and
  a processing module for detecting the target parameter in the multimedia data to be played if the shield instruction is received, and performing the shield processing on the multimedia data to be played if the target parameter in the multimedia data to be played satisfies the preset condition.

In a third aspect, the present disclosure provides an electronic device including: at least one processor and a memory,
  the memory storing computer executable instructions,
  the at least one processor executing the computer executable instructions stored by the memory, causing the at least one processor to execute the multimedia data processing method in the first aspect as described above and a variety of possible designs from the first aspect.

In a fourth aspect, the present disclosure provides a computer readable storage media storing computer executable instructions therein, when executed by a processor, causing execution of the multimedia data processing method as described above in the first aspect and a variety of possible designs in the first aspect.

In a fifth aspect, the present disclosure provides a computer program product containing a computer program, when executed by a processor, causing execution of the multimedia data processing method as described above in the first aspect and a variety of possible designs in the first aspect.

Embodiments of the present disclosure provide a multimedia data processing method, apparatus, and electronic device. In the solution, it can firstly detect whether a shield instruction for playing multimedia data is received, wherein the shield instruction indicates that a shield processing is performed on multimedia data whose target parameter satisfies a preset condition, and if the shield instruction is received, then detects the target parameter in the multimedia data to be played, and performs the shield processing on the multimedia data to be played if the target parameter in the multimedia data to be played satisfies the preset condition. In the manner of firstly detecting whether the shield instruction is received, and when the shield instruction is detected, then automatically performing the shield processing on the target parameter in the multimedia data satisfying the preset condition, the operation procedure by a user for shielding multimedia data that may cause user's physical discomfort can be simplified, the user's experience can be improved, and the damage to the user can be avoided.

DESCRIPTION OF THE DRAWINGS

In order to more clearly illustrate technical solutions in the present disclosure or in the prior art, the accompanying drawings required to be used in the embodiments or prior art descriptions will be described, and it is obvious that the accompanying drawings in the following description are some embodiments of the present disclosure, and for those skilled in the art, other figures can be obtained in accordance with these figures without creative effort.

DETAILED DESCRIPTION OF PREFERRED EMBODIMENTS

In order to make the objects, technical solutions, and advantages of the present disclosure more clear, the technical solutions in the present disclosure will be described in connection with the drawings of the present disclosure clearly and completely. It is obvious that the described embodiments are a part of the embodiments of the present disclosure, not all of the embodiments. Based on the embodiments of the present disclosure, those of ordinary skilled in the art can obtain all other embodiments without creative effort, which all are in the scope of the present disclosure.

Figure 1:
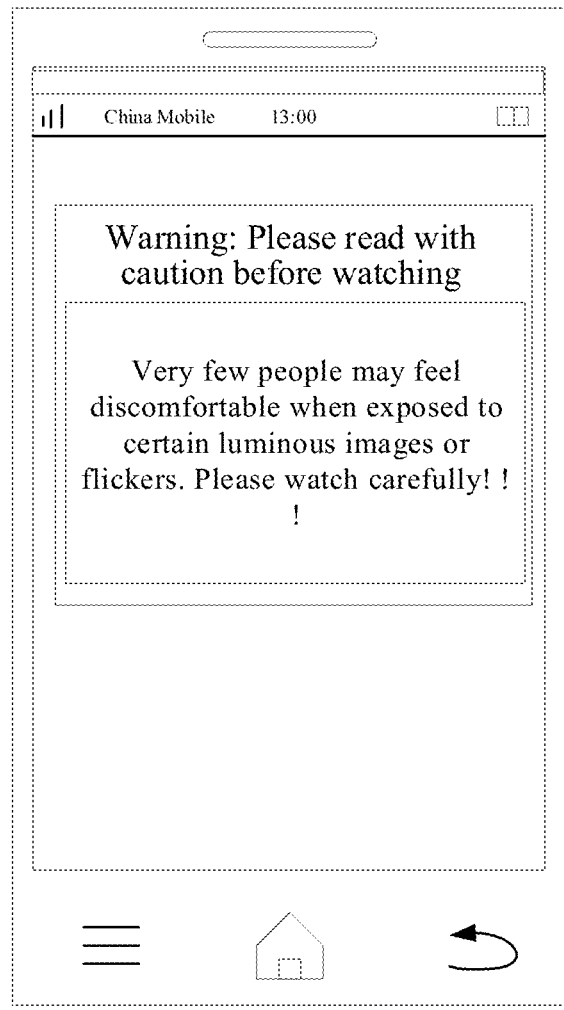
FIG. 1 is a schematic diagram of a hazard indication in the prior art provided in an embodiment of the present disclosure.

In the prior art, when users are viewing multimedia data such as watching video, browsing news, or listening to music, etc. by means of applications deployed on terminal devices, physical discomfort may be induced for a user due to user's own genetic factors when the user is viewing some specific multimedia data. For example, when the user is watching a video, photosensitive epilepsy may be induced for the user due to flicker frequency of the video. However, in the prior art, for the above problems, the damage that may be caused by multimedia data may be notified to the user only in a manner of alarm prompt. As an example, FIG. 1 is a schematic diagram of a hazard indication in the prior art provided in an embodiment of the present disclosure. As shown in FIG. 1, in this embodiment, taking an example of displaying a game screen, before the user plays the game, a terminal device can issue a text prompt to notify the user that the game screen may cause damage to the user for a case which may induce user's discomfort, and the user still needs to manually close the game or continues to play the game, and all the above steps shall be repeated for each kind of multimedia data that may cause user's physical discomfort, the operation is cumbersome, affects the user's experience and may bring damage to the user.

With respect to the above problem, in the manner of firstly detecting whether a shield instruction is received, and when the shield instruction is detected, then automatically performing a shield processing on a target parameter in the multimedia data satisfying a preset condition, the present disclosure can reach a function capable of performing unified shielding processing on all multimedia data that may cause user's physical discomfort, and achieve technical effects that the operation procedure by a user for shielding a multimedia data that may cause user's physical discomfort can be simplified, the user's experience can be improved, and the damage to the user can be avoided.

Figure 2:
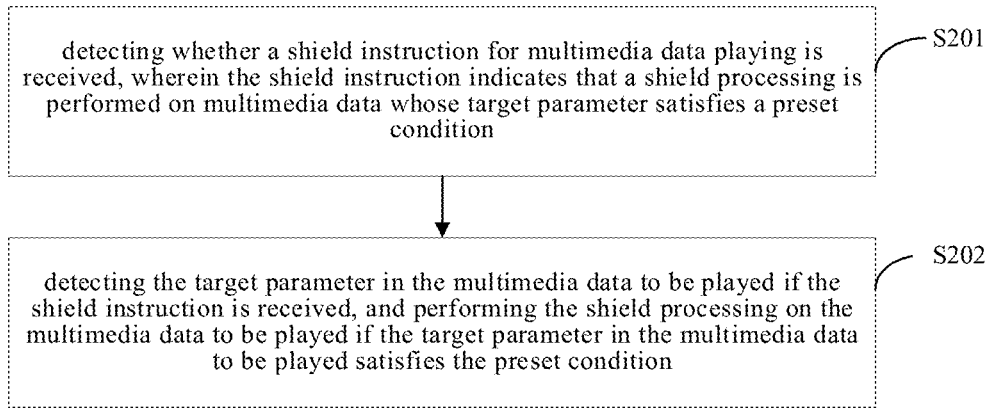
FIG. 2 is a flowchart of a multimedia data processing method provided in an embodiment of the present disclosure.

FIG. 2 is a flow schematic diagram of a multimedia data processing method provided in an embodiment of the present disclosure. As shown in FIG. 2, the method of the present embodiment can be performed by a terminal device which may include smartphone, tablet, personal computer, wearable electronic device, smart home device, etc. which can realize functions of playing video, playing audio, displaying news, or running games, and so on. As shown in FIG. 2, the multimedia data processing method can include:

S201: it is detected whether a shield instruction for multimedia data playing is received, wherein the shield instruction indicates that a shield processing is performed on multimedia data whose target parameter satisfies a preset condition.

In the present embodiment, several applications can be installed on the terminal device, each application can realize a different function, for example, playing video, playing audio, displaying news, or running games, and so on. Each application can correspond to a different state, in particular, an application can correspond to a running state, or may correspond to a non-running state. That the application is in the running state means that the user is using the application, and that the application is in the non-running state means the user does not use the application.

Further, when the application is in the running state, it is possible to detect whether a shield instruction for multimedia data is received, wherein the shield instruction can indicate that a shield processing is performed on multimedia data whose target parameter satisfies a preset condition.

Among them, the target parameter can have a variety of types, and different types of target parameters can correspond to different preset conditions. Specifically, the target parameter may be a light flicker frequency. When the target parameter is the light flicker frequency, the corresponding multimedia data can be video type data or game data, and the preset condition can be that the light flicker frequency reaches a preset frequency, for example, the preset condition can be that the light flicker frequency is in the range of 5-30 times per second, that is, when the light flicker frequency is an arbitrary value in the range of 5-30 Hz, physical discomfort may be induced for a user due to user's own genetic factors when the user is viewing some specific multimedia data. Therefore, it is possible to avoid the damage to the user by performing the shield processing on the multimedia data carrying the light flickering frequency in the range of 5-30 Hz. In addition, the target parameter can be further a sound intensity, when the multimedia data to be played is audio type data, video type data, or game data, the sound intensity carried in video type data, audio type data, or game data that reaches a preset decibel may cause damage to the user's hearing. Therefore, when the sound intensity reaches a preset decibel, it is possible to perform the shield processing on the multimedia data carrying a sound intensity that exceeds the preset decibel, and accordingly, a preset intensity can be a sound intensity exceeding 70 decibel.

S202: if the shield instruction is received, the target parameter in the multimedia data to be played is detected, and if the target parameter in the multimedia data to be played satisfies the preset condition, the shield processing is performed on the multimedia data to be played.

In the present embodiment, the shield instruction can indicate that a shield processing is performed on multimedia data whose target parameter satisfies a preset condition, therefore, upon receipt of the shield instruction, the target parameter in the multimedia data to be played can be first detected, and then the shield processing can be performed on the multimedia data to be played if the target parameter in the multimedia data to be played satisfies the preset condition. If the target parameter in the multimedia data to be played does not satisfy the preset condition, the multimedia data to be played can be played directly.

Among them, the multimedia data to be played can be multimedia data corresponding to all application scenarios to which the running application relates, such as video data. The multimedia data to be played may be data sent from the server side, or data that is pre-stored in the terminal device or acquired by the terminal device in real-time.

Further, detection of the target parameter in multimedia data to be played can be specifically implemented in a variety of manners, in one embodiment, the terminal device can detect whether the target parameter in the multimedia data to be played satisfies the preset condition by a pre-trained detection model; in another embodiment, the terminal device can perform the detection by means of a mark carried by the multimedia data itself, to detect whether the target parameter in the multimedia data to be played satisfies the preset condition.

When the detection is performed by a pre-trained detection model, the specific implementation manner of detecting whether the target parameter in the multimedia data to be played satisfies the preset condition can include detecting whether the target parameter in the multimedia data to be played satisfies the preset condition based on a parameter detection model.

Specifically, a parameter detection model can be pre-trained, and then whether the target parameter in the multimedia data to be played satisfies the preset condition can be detected based on the trained parameter detection model. Correspondingly, the parameter detection model can be trained from target parameter samples. Different target parameters correspond to different target parameter samples, and different target parameters samples can train the parameter detection models for detecting different target parameters. As an example, when the target parameter is a light flicker frequency, the corresponding target parameter samples are the light flicker frequency data carrying training marks, for example, in an example that a parameter detection model capable of detecting multimedia data whose light flicker frequency is in the range of 5-30 times per second is trained, the used target parameter samples can include: a target parameter sample D whose light flicker frequency is 10 times per second and which carries a positive sample mark, and a target parameter sample E whose light flicker frequency is 3 times per second and which carries a negative sample mark, etc. By training a parameter detection model by utilizing light flicker frequency sample data carrying a training mark, it is possible to train a parameter detection model capable of detecting multimedia data whose light flicker frequency is in the range of 5-30 times per second.

In another embodiment, when performing the detection based on the mark carried by the multimedia data itself, the specific implementation manner of detecting whether the target parameter in the multimedia data to be played satisfies the preset condition can be: detecting a first mark in the multimedia data, the first mark characterizing whether the target parameter satisfies the preset condition.

Specifically, when generating multimedia data, the terminal device can provide the multimedia data with a first mark indicating whether a corresponding target parameter satisfies the preset condition, and subsequently, when detecting the multimedia data, the terminal device can directly detect the first mark in the multimedia data, if the first mark indicates that the preset condition is satisfied, the corresponding target parameter in the multimedia data satisfies the preset condition, and if the first mark indicates that the preset condition is not satisfied, the corresponding target parameter in the multimedia data does not satisfy the preset condition. In addition, the first mark in the multimedia data can also be set by a server, for example, the server can detect multimedia data (e.g., the server can detect whether the target parameter in the multimedia data to be played satisfies the preset condition by means of a trained parameter detection model, which can be specifically implemented as above and will not be described here), and set the first mark according to the detection result; in addition, the server can also set the first mark in the multimedia data according to a related attribute information in the multimedia data, for example, the server can detect special effect information in the multimedia data, and set the first mark in the multimedia data based on the special effect information.

Among them, the first mark can be represented in a variety of manners, for example, that the first mark is set to an uppercase letter represents the target parameter satisfies the preset condition, and that the first mark is set to a lowercase letter represents the target parameter does not satisfy the preset condition. Furthermore, it is also possible to set the first mark to 1 to indicate that the target parameter satisfies the preset condition, and to set the first mark to 0 to indicate that the target parameter does not satisfy the preset condition. And other manners of representing the first mark are also within the scope of the present disclosure, and the manner of representing the first mark is not specifically limited herein.

Using the above scheme, the terminal device can firstly detect whether a shield instruction for multimedia data playing is received, wherein the shield instruction indicates that a shield processing is performed on multimedia data whose target parameter satisfies a preset condition, and if the shield instruction is received, then detect the target parameter in the multimedia data to be played, and if the target parameter in the multimedia data to be played satisfies the preset condition, perform the shield processing on the multimedia data to be played. In the manner of firstly detecting whether the shield instruction is received, and when the shield instruction is detected, then automatically performing the shield processing on the target parameters in the multimedia data satisfying the preset condition, the operation procedure by a user for shielding a multimedia data that may cause user's physical discomfort can be simplified, the user's experience can be improved, and the damage to the user can be avoided.

Further, when a shield processing is performed on multimedia data to be played whose target parameter satisfies the preset condition, there may be a variety of implementations: in one embodiment, it is possible to perform the detection during multimedia data playing, and perform the shield processing when it is detected the target parameter satisfies the preset condition; in addition, it is possible to turn on or off the mask function for the multimedia data playing by means of a shield instruction option switch, before multimedia data is played.

Figure 3A:
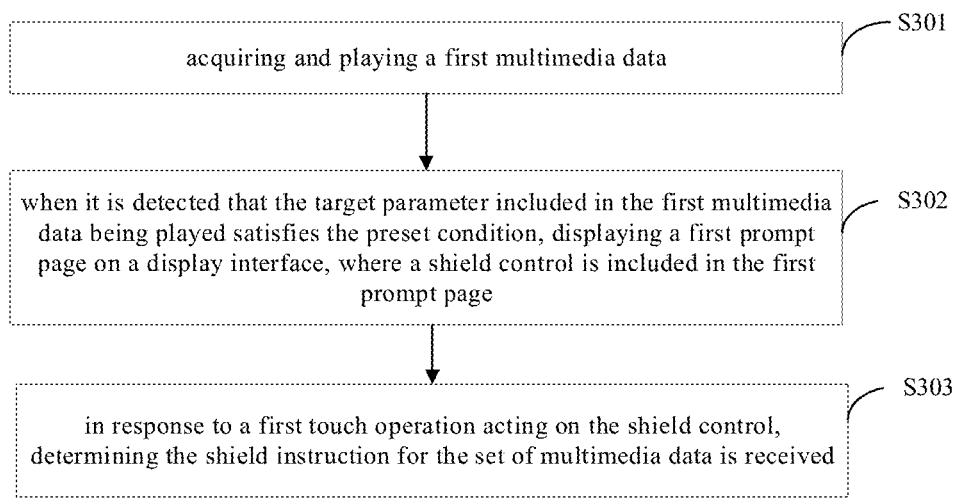
FIG. 3A is a flowchart of a multimedia data processing method provided in another embodiment of the present disclosure.

FIG. 3A is a flowchart of a multimedia data processing method provided in another embodiment of the present disclosure, in this embodiment, the detection is performed during multimedia data playing, and the shield processing is performed when it is detected the target parameter satisfies the preset condition, as shown in FIG. 3A, S201 can specifically include:

S301: Acquire and play first multimedia data.

S302: When it is detected that the target parameter included in the first multimedia data being played satisfies the preset condition, display a first prompt page on a display interface, where a shield control is included in the first prompt page.

S303: determine that the shield instruction is received, in response to a first touch operation acting on the shield control.

In the present embodiment, the first touch operation can be a click operation, a long press operation or a repeat press operation. The present disclosure does not limit the specific type of touch operation. In the process of acquiring and playing the first multimedia data, it is possible to detect whether the target parameter in the first multimedia data satisfies the preset condition, and when it is detected that the target parameter in the first multimedia data being played satisfies the preset condition, the first prompt page can be displayed on a display interface, where the first prompt page can be a shield mask layer, and the shield mask layer includes a shield control thereon, the terminal device can determine receipt of the shield instruction for a set of multimedia data, in response to a first touch operation acting on the shield control. Among them, the first prompt page is displayed while covering the play interface of the first multimedia data, and the first multimedia data continues to be play when the first prompt page is displayed.

Figure 4:
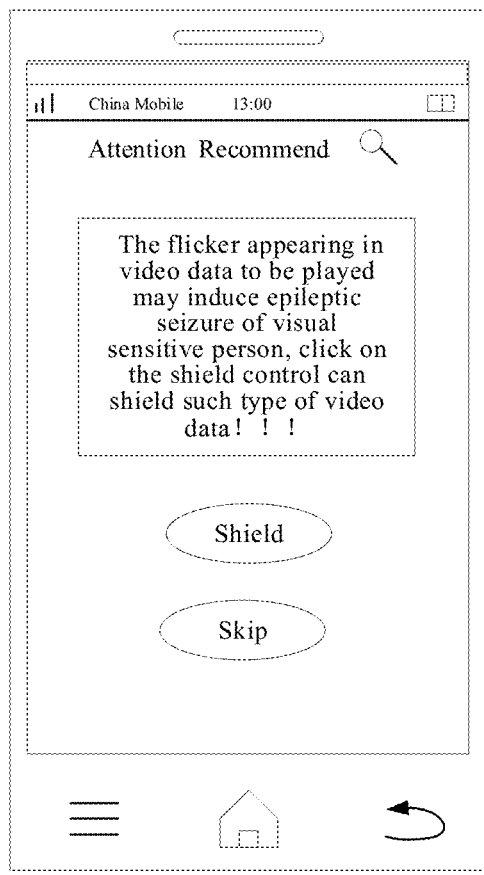
FIG. 4 is a schematic diagram of application of a first prompt page provided in an embodiment of the present disclosure.

As an example, FIG. 4 is a schematic diagram of application of a first prompt page provided in an embodiment of the present disclosure, as shown in FIG. 4, in the present embodiment, the multimedia data is video type data, the target parameter is the light flicker frequency, for example, for a video which may cause user's physical discomfort, even damage, such as photosensitive epilepsy induced by visual stimulus (i.e., a video whose light flicker frequency is larger than a preset frequency), the first prompt page is displayed while covering the play interface of the video, the first prompt page can be in form of mask layer, and the prompt page can include prompt text and a shield control, and the prompt text can be, for example, "the flicker appearing in video data to be played may induce epileptic seizure of visual sensitive person, click on the shield control to shield such type of video data!".

The first prompt page can be provided with a control to close the first prompt page (for example, play control, skip control, or close control), so that the user can close the first prompt page and continue to watch video data.

When the first prompt page includes a skip control, the method can also include:

playing the first multimedia data in response to a second touch operation acting on the skip control. For example, in response to the second touch operation acting on the skip control, the first prompt page can be removed from the first multimedia data play interface and the first multimedia data continues to be played.

Figure 3B:
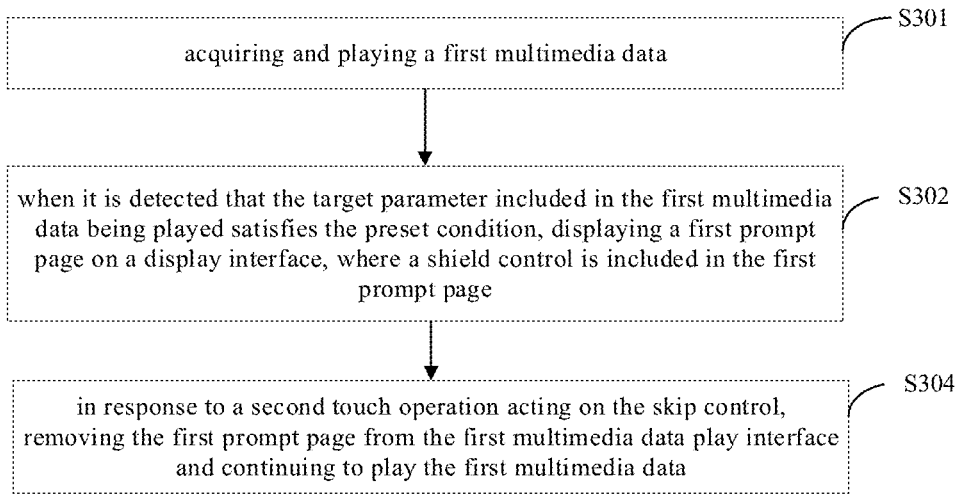
FIG. 3B is a flowchart of a multimedia data processing method provided in another embodiment of the present disclosure.

FIG. 3B is a flowchart of a multimedia data processing method provided in another embodiment of the present disclosure, in this embodiment, the detection is performed during multimedia data playing, and the user can continue to watch the video data without performing the shield operation, the operation may include:

S301: Acquire and play first multimedia data.

S302: When it is detected that the target parameter included in the first multimedia data being played satisfies the preset condition, display a first prompt page on a display interface, where a skip control is included in the first prompt page.

S304: in response to the second touch operation acting on the skip control, removing the first prompt page from the first multimedia data play interface and continuing to play the first multimedia data.

Specifically, the second touch operation can be a click operation, a long press operation or a repeat press operation, can be the same as the first touch operation, or may be different from the first touch operation.

Figure 5:
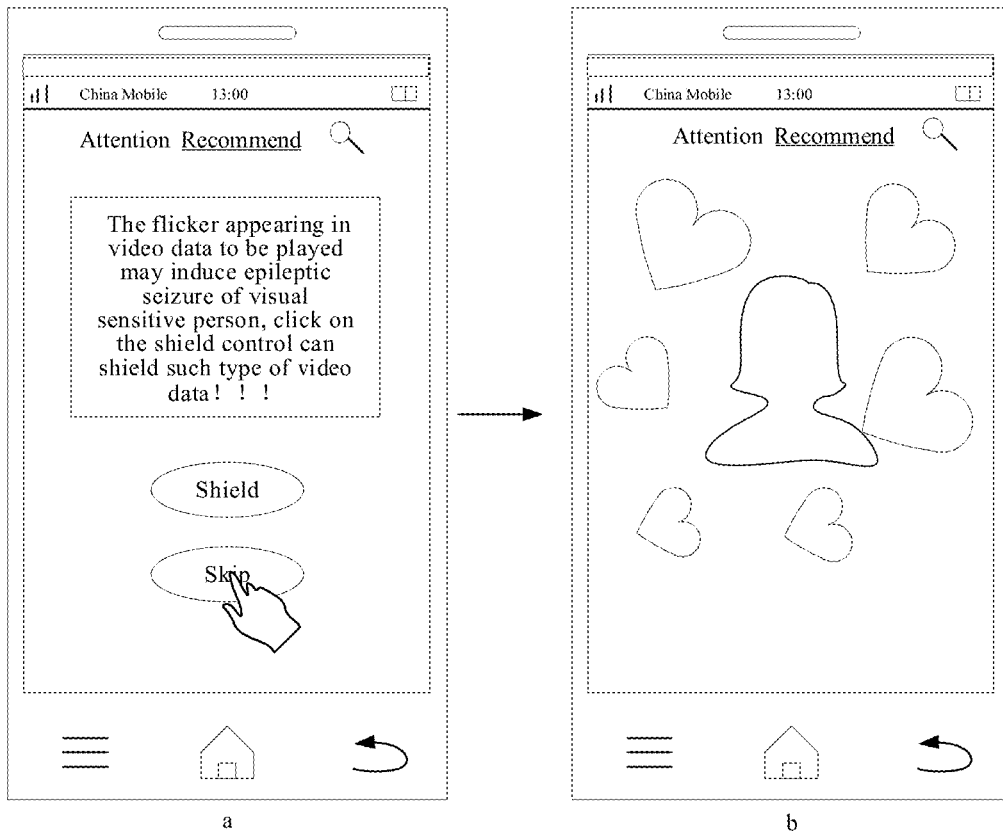
FIG. 5 is a schematic diagram of application of a first prompt page provided in another embodiment of the present disclosure.

As an example, FIG. 5 is a schematic diagram of application of a first prompt page provided in another embodiment of the present disclosure, as shown in FIG. 5, in this embodiment, in addition to a shield control, the first prompt page includes a skip control therein, if the user is insensitive with the light flicker frequency in the played multimedia data and wants to continue to view the relevant multimedia data, such as video, the user can perform the second touch operation to trigger the play function corresponding to the skip control and continue to watch the video. As shown in figure b of FIG. 5, after the user touches the skip control, the terminal device can play the multimedia data, such as, the video data with heart-shaped effects having flicker or stroboscopic lighting effect, in response to the second touch operation acting on the skip control.

Figure 6A:
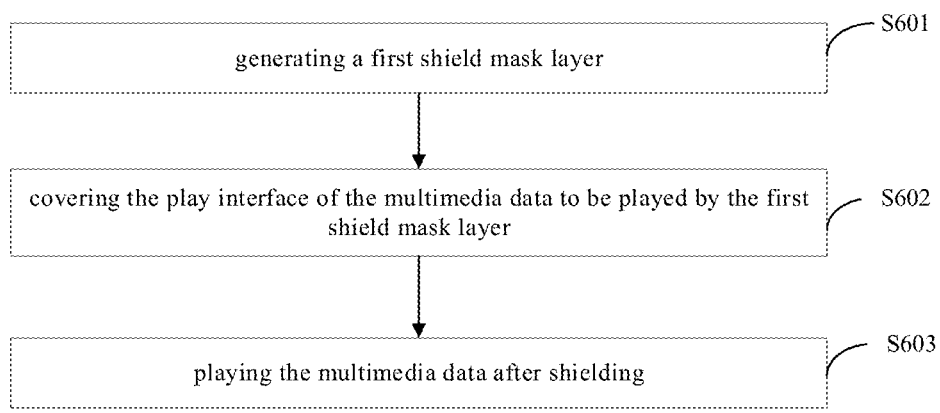
FIG. 6A is a flowchart of a multimedia data processing method provided in another embodiment of the present disclosure.

FIG. 6A is a flowchart of a multimedia data processing method provided in another embodiment of the present disclosure. In addition, in one possible implementation, as shown in FIG. 6, the specific implementation of performing the shield processing on the multimedia data to be played in S202 can include, after S303:

S601: generating the first shield mask layer;

S602: covering the play interface of the multimedia data to be played by the first shield mask layer, and S603: playing the multimedia data after shielding.

In the present embodiment, when the target parameter is the light flicker frequency, after determining that the shield instruction for the set of multimedia data is received, the terminal device detects the target parameter in the multimedia data to be played satisfies the preset condition, for example, the light flickering frequency in the multimedia data to be played is in the range of 5-30 times per second, and can generate the first shield mask layer, then cover the play interface of the multimedia data to be played by the first shield mask layer, and play the multimedia data after shielding. Among them, the corresponding specific parameters of the first shield mask layer can be set according to the actual requirement, for example, in one embodiment, the specific parameters of the first shield mask layer may be: color 000000, transparency of 50%, the effect is background blur; in another embodiment, the specific parameters of the first shield mask layer may be: color 000000, transparency of 80%, and the effect is no background blur. Further, it is also possible to adjust the specific parameters of the shield mask layer according to the actual requirement to implement the shield processing on the multimedia data whose target parameters satisfy the preset conditions, so that it is possible to protect a user which is sensitive with the light flicking frequency and may be damaged during watching the vide data.

The first mask layer can display semantic text, such as multimedia data has been shielded, and the play interface of multimedia data can be covered by the first shield mask layer.

For example, when the terminal device determines that the shield instruction for the multimedia data is received (e.g., in response to the first touch operation acting on the shield control provided on the first prompt page, or in response to a turn-on operation acting on the shield instruction option switch provided on the setup interface), the server may not send the multimedia data whose target parameters satisfy the preset conditions to the terminal device. However, in actual operations, there may exist a scenario that the server sends the multimedia data whose target parameters satisfy the preset conditions to the terminal device and the terminal device plays the multimedia data in response to the trigger operation of the user. When the user triggers the operation to play the multimedia data whose target parameters satisfy the preset conditions, the terminal device can cover and display the first shield mask layer on the play interface of the multimedia data. Further, the first shield mask layer can be provided with semantic text, such as the multimedia data has been shielded, and by means of the semantic text that the multimedia data has been shielded, the user can promptly know that multimedia data which may induce body discomfort has been shielded, thereby improving the user's experience and avoiding the damage to the user.

Figure 6B:
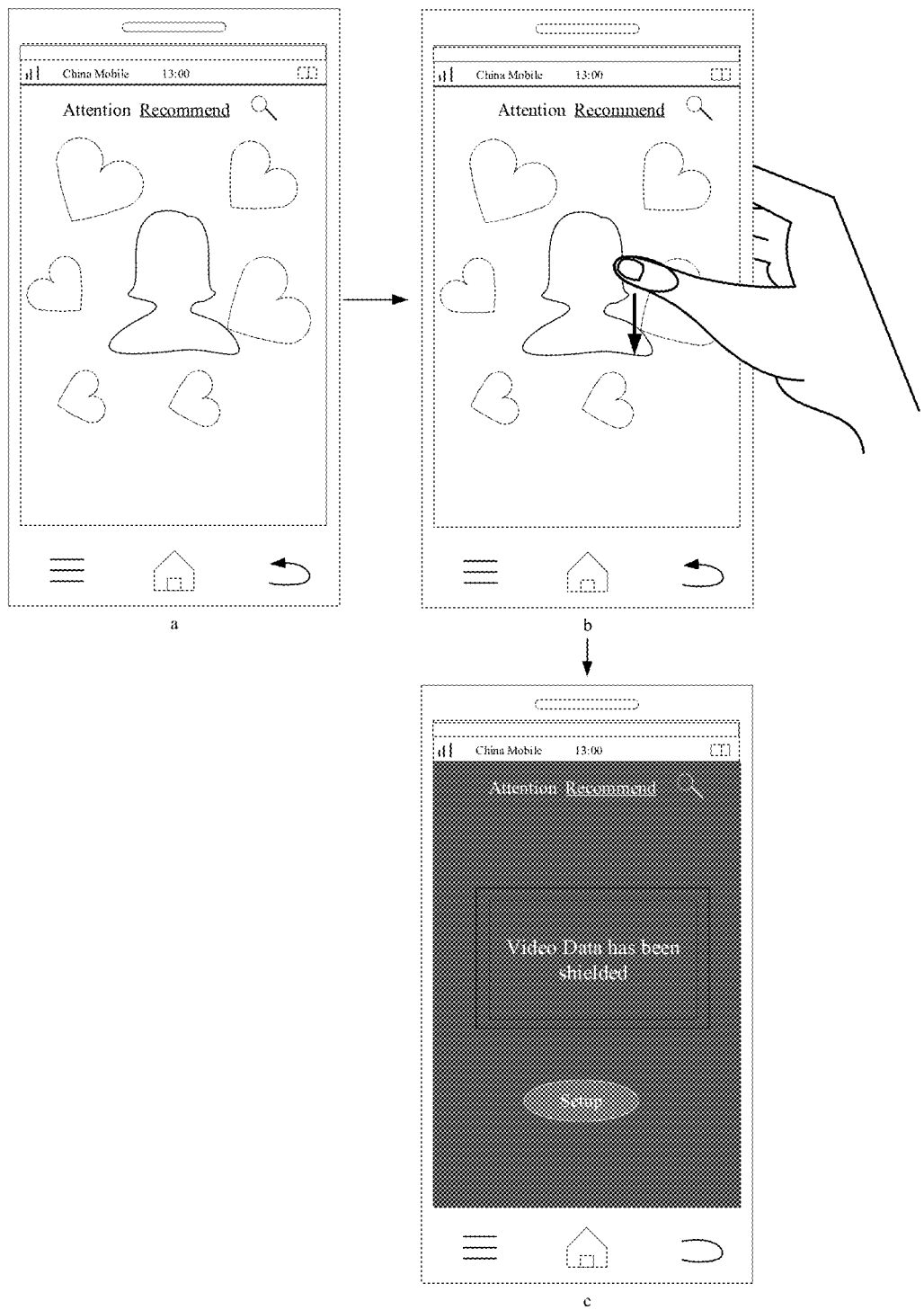
FIG. 6B is a schematic diagram of application of a first shield mask layer provided in an embodiment of the present disclosure.

As an example, FIG. 6B is a schematic diagram of application of a second shield mask layer provided in an embodiment of the present disclosure. In this embodiment, multimedia data is video type data. As shown in figure a of FIG. 6B, in this embodiment, the user watches the video type data having heart-shaped effects whose target parameters do not satisfy the preset conditions through a video application. As shown in figure b of FIG. 6B, after having watched the video type data whose target parameters do not satisfy the preset conditions, the user can trigger playing the next video data by a sliding down operation. The next video data to be played can be video type data whose target parameters satisfy the preset conditions (e.g., video data that has been played previously or transmitted from the server). As shown in figure c of FIG. 6B, since the video data to be played is the video type data whose target parameters satisfy the preset conditions, the first shield mask layer can be utilized to cover the playing interface of the video data to be played. Further, the first shield mask layer can include prompt text thereon to notify the user that the video data has been shielded, for example, the prompt text can be "the video data has been shielded".

Figure 8:
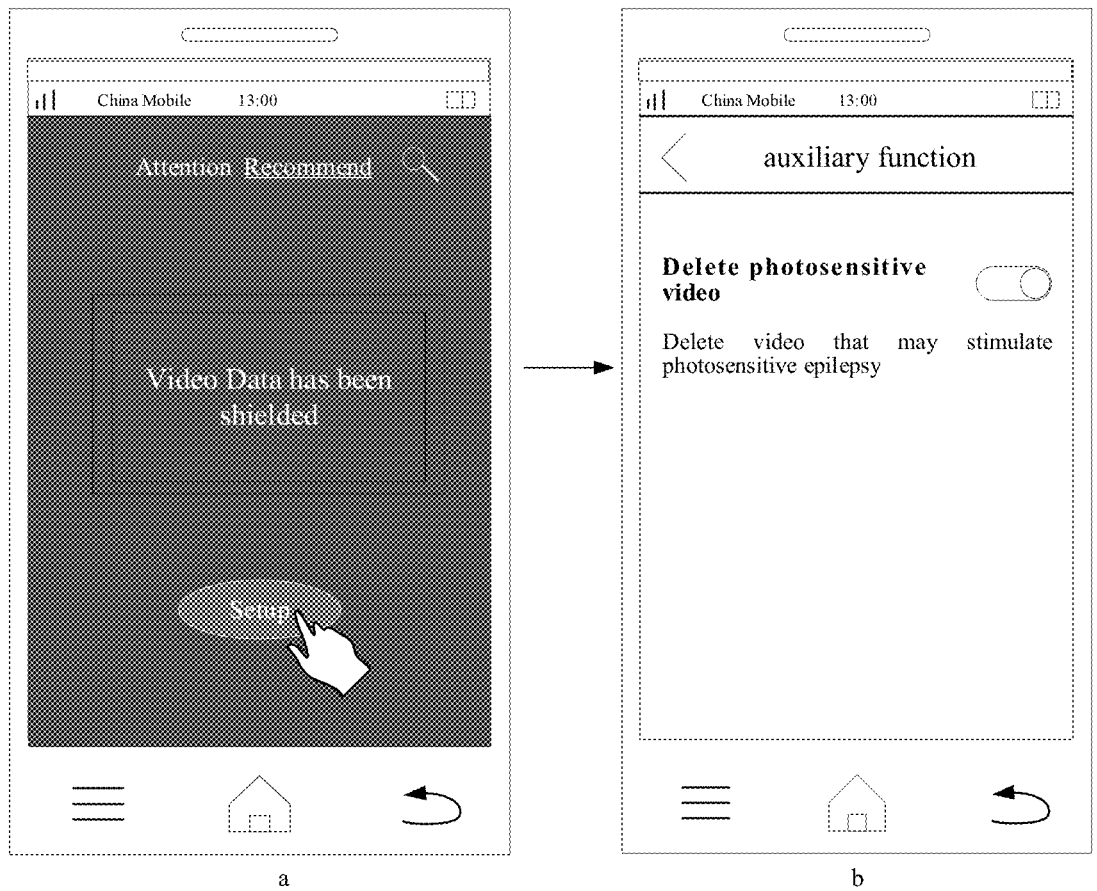
FIG. 8 is a schematic diagram of application of a closing operation provided in an embodiment of the present disclosure.

Further, the first shield mask layer can include a setup control thereon, as shown in figure a of FIG. 8, by the setup control, it can jump to a setup interface, as shown in figure b of FIG. 8, wherein the setup interface includes the shield instruction option switch thereon, and in response to the close operation acting on the shield instruction option switch, the shield function for multimedia data playing is turned off.

Figure 7A:
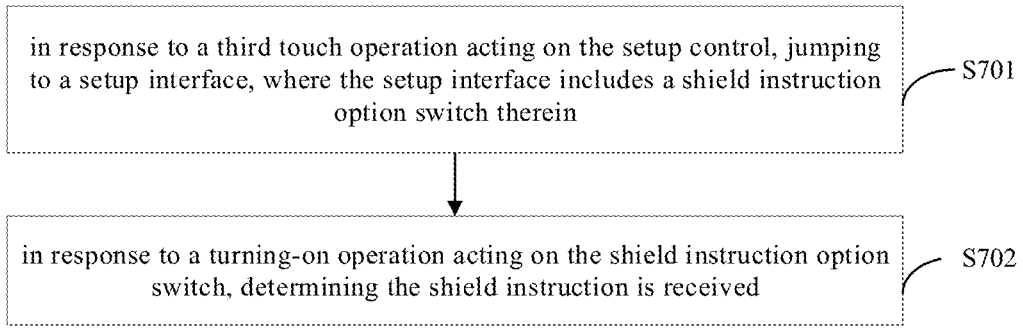
FIG. 7A is a flowchart of a multimedia data processing method provided in still another embodiment of the present disclosure.

Moreover, in another embodiment, the user can turn on or turn off the shield function for multimedia data playing by the shield instruction option switch, before the multimedia data is played or when the application of playing the multimedia data is activated. FIG. 7A is a flowchart of a multimedia data processing method according to still another embodiment of the present disclosure, as shown in FIG. 7A, in this embodiment, the display interface of the terminal device includes the setup control thereon, S201 may specifically include:

S701: in response to a third touch operation acting on the setup control, jump to the setup interface, where the setup interface includes a shield instruction option switch therein.

S702: determine the shield instruction is received in response to the turning-on operation acting on the shield instruction option switch.

In the present embodiment, the display interface of the terminal device can include a setup control thereon, before the multimedia data is played or when the application of playing the multimedia data is activated, the user can jump to a setup interface (the setup interface can be that as shown in figure b of FIG. 8) by the setup control on the display interface of the terminal device, and turn on or turn off the shield function for multimedia data playing by the setup control included in the setup interface.

Figure 7B:
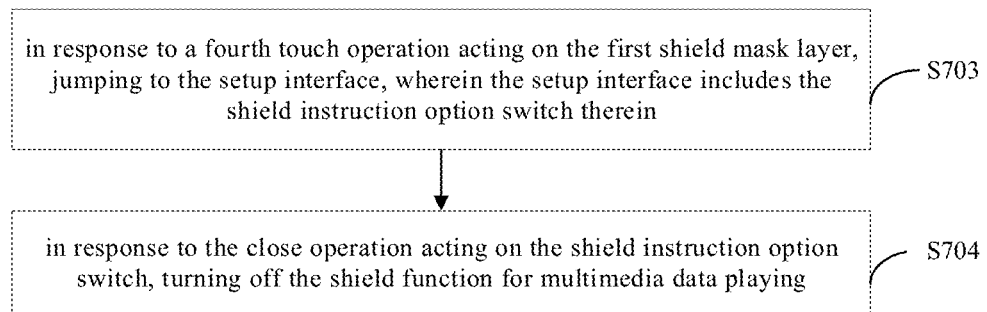
FIG. 7B is a flowchart of a multimedia data processing method according to still another embodiment of the present disclosure.

Further, in another embodiment, in the case of covering the playing interface of the multimedia data to be played by the first shield mask layer and playing the multimedia data after shielding, the user can turn off the shield function. FIG. 7B is a flowchart of a multimedia data processing method according to still another embodiment of the present disclosure, the operation can be performed by the terminal device, as shown in FIG. 7, the method can include:

S703: in response to a fourth touch operation acting on the first shield mask layer, jump to the setup interface, wherein the setup interface includes the shield instruction option switch therein; and S704: in response to the close operation acting on the shield instruction option switch, the shield function for multimedia data playing is turned off.

In the present embodiment, after covering the playing interface of the multimedia data to be played by the first shield mask layer, and playing the multimedia data after shielding, the terminal device can display the setup control on the first shield mask layer, and can jump to the setup interface by the setup control. Then, the terminal device can turn off the shield function for multimedia data playing in response to the closing operation acting on the shield instruction option switch in the setup interface.

As an example, FIG. 8 is a schematic diagram of application of a closing operation provided in an embodiment of the present disclosure, in the present embodiment, the target parameter is a light flicker frequency, and the first shield mask layer includes a setup control therein applicable to the video type data which may induce user's discomfort (for example, photosensitive epilepsy). As shown in figure a of FIG. 8, in order to play the multimedia data after shielding, for example, the light flickering frequency in the video data reaches a preset frequency value, the terminal device covers and displays the first shield mask layer on the playing interface of the video data, and a textual prompt information of "video data has been shielded" is provided on the first shield mask layer. In addition, a setup control is also provided on the first shield mask layer. As shown in figure b of FIG. 8, after the user touches the setup control, the terminal device can jump to the setup interface corresponding to the multimedia data in response to this touch operation, as shown in figure b, the setup interface includes the shield instruction option switch thereon, through which the shield function for multimedia data playing can be turned on or off. In addition, in order to allow users to accurately understand the functionality of the shield instruction option, the shield instruction option switch can be named "Delete Photosensitive Video" option switch, and the specific function of the option switch can be further interpreted below the option switch name, for example, for the video data that may induce photosensitivity epilepsy, can be interpreted as "Delete video that may stimulate photosensitive epilepsy".

In a possible implementation, the specific implementation of shielding the multimedia data to be played in S202, after S303, may include: delete the multimedia data to be played. For example, when the terminal device detects that the target parameter in the multimedia data to be played satisfies the preset condition, the multimedia data can be deleted without being played to the user, so that it is possible to protect a user which is sensitive with the light flicking frequency and may be damaged during watching the vide data, and the storage space of the terminal device can be further saved.

In addition, for the multimedia data whose target parameters do not satisfy the preset conditions, turning on or turning off the shield instruction does not influence the multimedia data to be played whose target parameters do not satisfy the preset conditions, and the terminal device can directly play the multimedia data whose target parameters do not satisfy the preset conditions.

Figure 7C:
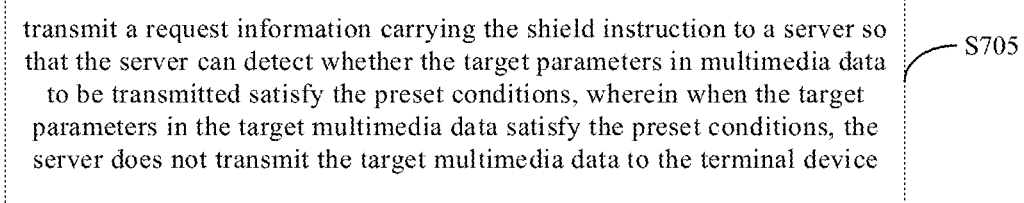
FIG. 7C is a flowchart of a multimedia data processing method according to still another embodiment of the present disclosure.

In another embodiment, after the shield instruction is received, the detection operation can be performed on the server side. FIG. 7C is a flowchart of a multimedia data processing method according to still another embodiment of the present disclosure, the operation can be performed by the terminal device, as shown in FIG. 7C, after receipt of the shield instruction, the method can further include:

S705: transmit a request information carrying the shield instruction to a server so that the server can detect whether the target parameters in multimedia data to be transmitted satisfy the preset conditions, wherein when the target parameters in the target multimedia data satisfy the preset conditions, the server does not transmit the target multimedia data to the terminal device.

In the present embodiment, it is possible to perform a detection process by the server for detecting whether the target parameters in the target multimedia data satisfy the preset conditions, and when it is detected the target parameters in the target multimedia data satisfy the preset conditions, the server does not transmit the target multimedia data to the terminal device, so that the transmission process of the data can be simplified, thereby increasing the efficiency of data processing, and can further protect the user.

Figure 9:
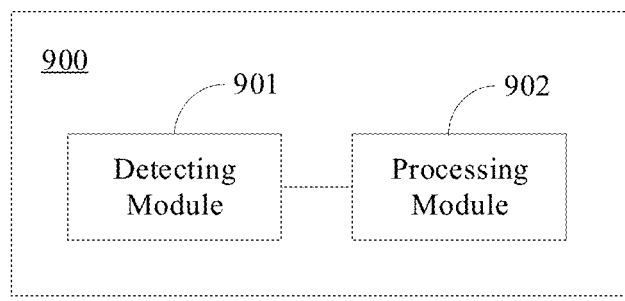
FIG. 9 is a schematic structural diagram of a multimedia data processing apparatus provided in an embodiment of the present disclosure.

Corresponding to the multimedia data processing method according to the above embodiments, FIG. 9 is a schematic structural diagram of a multimedia data processing apparatus 900 provided in an embodiment of the present disclosure. For convenience of explanation, only parts related to the embodiments of the present disclosure are illustrated. As shown in FIG. 9, the apparatus 900 can include:

a detection module 901, for detecting whether a shield instruction for multimedia data playing is received, wherein the shield instruction indicates that a shield processing is performed on multimedia data whose target parameter satisfies a preset condition.

In the present embodiment, in one implementation, the detection module 901 can be further used for:
detecting whether the target parameter in the multimedia data to be played satisfies the preset condition based on a parameter detection model.

In another implementation, the detection module 901 can be further used for:

detecting a first mark in the multimedia data, the first mark characterizing whether the target parameter satisfies the preset condition.

In another embodiment, the detection module 901 can be further used for:
acquiring and playing a first multimedia data.
when it is detected that the target parameter included in the first multimedia data being played satisfies the preset condition, displaying a first prompt page on a display interface, where a shield control is included in the first prompt page.

It is determined that the shield instruction for the set of multimedia data is received, in response to a first touch operation acting on the shield control.

a processing module 902 for detecting the target parameter in the multimedia data to be played if the shield instruction is received, and performing the shield processing on the multimedia data to be played if the target parameter in the multimedia data to be played satisfies the preset condition.

In the present embodiment, the first prompt page covers and displays on the playing interface of the first multimedia data, and when the first prompt page is displayed, the first multimedia data continues to be played.

In addition, the first prompt page also includes a skip control, the processing module 902 is also used for:
removing the first prompt page and continuing to play the first multimedia data, in response to a second touch operation acting on the skip control.

Further, a setup control is included on a display interface of the terminal device, the detection module 901 is further used for:
in response to a third touch operation acting on the setup control, jumping to a setup interface, where the setup interface includes a shield instruction option switch therein.

In response to a turning-on operation acting on the shield instruction option switch, determining the shield instruction is received.

Where, the target parameter includes a light flicker frequency.

Further, the processing module 902 is further used for:
generating a first shield mask layer;
covering the play interface of the multimedia data to be played by the first shield mask layer, and playing the multimedia data after shielding.

Further, in another embodiment, the processing module 902 is further used for:
in response to a fourth touch operation acting on the first shield mask layer, jumping to the setup interface, wherein the setup interface includes the shield instruction option switch therein.

In response to a close operation acting on the shield instruction option switch, the shield function for multimedia data playing is turned off.

Further, in another embodiment, the processing module 902 is further used for:
deleting the multimedia data to be played.

Further, in another embodiment, the processing module 902 is further used for:
transmitting a request information carrying the shield instruction to a server so that the server detects whether the target parameters in target multimedia data to be transmitted satisfy the preset conditions, wherein when the target parameters in the target multimedia data satisfy the preset conditions, the server does not transmit the target multimedia data to the terminal device.

The apparatus provided in this embodiment can be used to perform the technical solutions of the above method embodiments, and the implementation principle and technical effects are similar, which will not be described here.

It should be noted that each of the above modules only belongs to a logical module classified according to the specific function it implements, instead of limiting its specific implementation manner, for example, it can be implemented in software, hardware, or a combination of software and hardware. In an actual implementation, the foregoing units may be implemented as independent physical entities, or may be implemented by a single entity (for example, a processor (CPU or DSP, etc.), an integrated circuit, etc.).

Figure 10:
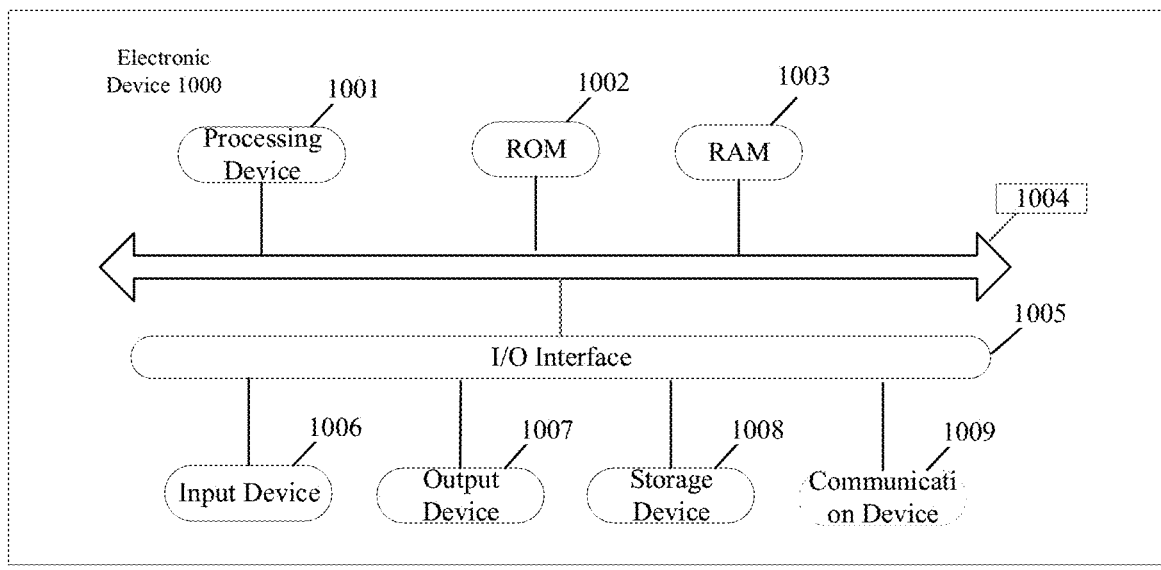
FIG. 10 is a schematic structural view of an electronic device provided in an embodiment of the present disclosure.

Referring to FIG. 10, which is a schematic structural view of an electronic device 1000 according to an embodiment of the present disclosure, the electronic device 1000 can be a terminal device or a server. Among them, the terminal device can include, but not limited to, a mobile terminal such as mobile phone, laptop, digital broadcast receiver, Personal Digital Assistant (PDA), Portable Android Device (PAD), Portable Multimedia Player (PMP), vehicle terminal (e.g., vehicle navigation terminal) and the like, and a fixed terminal such as digital TV, desktop computer, smart home device, and the like. The electronic device shown in FIG. 10 is merely an example, without limiting the functionality and usage range of embodiments of the present disclosure.

As shown in FIG. 10, the electronic device 1000 can include a processing device (e.g., a central processor, a graphics processor, etc.) 1001 and a memory, and the memory can include one or more computer program products, the computer program product can include a variety of computer readable storage mediums, such as volatile memory and/or non-volatile memory. The volatile memory can, for example, comprise a random access memory (RAM) 1003 and/or a cache, or the like. The non-volatile memory can, for example, include a read only memory (ROM) 1002, a hard disk, a flash, and the like. One or more computer program instructions can be stored on the computer readable storage medium, and a processor can run the program instruction to implement the functionalities of embodiments of the present disclosure as described above and/or other desired functionalities. The processing device 1001, the ROM 1002, and the RAM 1003 are connected to each other through bus 1004. The input/output (I/O) interface 1005 is also connected to the bus 1004.

Typically, the following devices can be connected to the I/O interface 1005: an input device 1006 including, for example, a touch screen, a touchpad, a keyboard, a mouse, a camera, a microphone, an accelerometer, a gyroscope, and the like, an output device 1007 including, for example, a liquid crystal display (referred to as LCD), a speakers, a vibrator, etc.; a storage device 1008 including, for example, a tape, a hard disk, or the like, and a communication device 10010. The communication device 1010 can allow the electronic device 1000 to communication with other devices wirelessly or in wired to exchange data. Although FIG. 10 illustrates an electronic device 1000 having various devices, it is to be understood that it does not require to implement or possess all of the devices, and alternatively, more or fewer devices can be implemented or possessed.

In particular, according to the embodiment of the present disclosure, the processes described above with reference to the flowcharts can be implemented as a computer software program. For example, an embodiment of the present disclosure includes a computer program product comprising a computer program carried on a computer readable medium, the computer program including program codes for executing the methods illustrated by the flowcharts. In such an embodiment, the computer program can be downloaded from the network via the communication device 1010 and installed, or can be installed from the storage device 1008 or from the ROM 1002. The computer program, when executed by the processing device 1001, executes the above functionalities defined in the methods of the present disclosure.

It should be noted that the computer readable medium of the present disclosure may be a computer readable signal medium or a computer readable storage medium or an arbitrary combination of the above. The computer readable storage medium is, for example, but not limited to, electrical, magnetic, light, electromagnetic, infrared, or semiconductor system, apparatus or equipments, or any combination thereof. More specific examples of computer readable storage medium can include, but not limited to, electrical connection having one or more wires, portable computer disk, hard disk, random access memory (RAM), read-only memory (ROM), erasable programmable read-only memory (EPROM or flash), fiber, portable compact disk read only memory (CD-ROM), optical storage device, magnetic storage device, or any suitable combination of the above. In the present disclosure, the computer readable storage medium can be any tangible medium comprising or storing programs, which can be used by or with an instruction execution system, apparatus, or device. In the present disclosure, the computer readable signal medium can include data signal propagating in a baseband or as part of carrier, the data signal carrying computer readable program codes. Such propagated data signals can be in a variety of forms, including, but not limited to, electromagnetic signals, optical signals, or any suitable combination of the above. The computer readable signal medium may also be any computer readable medium other than the computer readable storage medium, which can transmit, propagate, or transfer a program being used by or with an instruction execution system, apparatus, or equipment. The program codes included on the computer readable medium can be transmitted via any suitable media, including, but not limited to, wires, optical cables, RF (Radio Frequency), or the like, or any suitable combination of the above.

The above computer readable medium can be included in the electronic device; may also be stand-alone without being incorporated in the electronic device.

The computer readable medium carries one or more programs, which, executed by the electronic device, cause the electronic device to perform the method illustrated in the above embodiments.

Computer program codes for performing the operation of the present disclosure can be written in one or more programming languages or combinations thereof, and the programming languages include object-oriented programming languages—such as Java, SmallTalk, C++, and additionally include conventional procedural programming language—such as "C" language or similar programming language. The program codes can be executed completely on the user's computer, executed partially on the user's computer, executed as a stand-alone software packet, executed partially on the user's computer and particularly on the remote computer, or executed completely on the remote computer or server. In the case involving remote computers, remote computers can connect to the user computers via any kind of network-including Local Area Network (referred to as LAN) or Wide Area Network (referred to as WAN), or, can connect to the external computers (e.g., connect using by means of Internet service providers).

The flowcharts and block diagrams in the drawings illustrate possible architecture, function, and operation of the system, product, and computer program products in accordance with various embodiments of the present disclosure. In this regard, each block in the flowcharts or block diagrams can represent a module, block, or a portion of codes, the module, block, or the portion of codes contain one or more executable instructions for implementing prescribed logic functions. It should also be noted that in some alternative implementations, the functions labeled in the block can also occur in an order different from that in the drawings. For example, two connected blocks can actually be performed substantially in parallel, and they can sometimes be performed in reverse order, which is determined according to the functions involved. It is also noted that each block in block diagrams and/or flowcharts and a combination of blocks in block diagrams and/or flowcharts can be implemented by a dedicated hardware-based system that performs prescribed functions or operations, or can be implemented with a combination of dedicated hardware and computer instructions.

The units involved in the described embodiments in the present disclosure can be implemented in a manner of software, or can be implemented by hardware. Wherein, the name of unit does not constitute a definition for the unit itself, for example, a first acquisition unit can also be described as "a unit that acquires at least two network protocol addresses".

The functions described above can be performed at least partially by one or more hardware logic components. For example, non-limiting, the exemplary types of hardware logic components that can be used include: field programmable gate array (FPGA), dedicated integrated circuit (ASIC), special standard product (ASSP), on-chip system (SOC), complex programmable programmableLogic device (CPLD), etc.

In the context of the present disclosure, the computer readable medium may be a tangible medium, which may include or store programs capable of being used by or with instruction execution systems, devices, or devices. The computer readable medium can be a computer readable signal medium or a computer readable storage medium. Computer readable medium can include, but not limited to, electronic, magnetic, optical, electromagnetic, infrared, or semiconductor systems, apparatus or devices, or any suitable combination of the above. More specific examples of computer readable storage media can include electrical connection based on one or more lines, portable computer disk, hard disk, random access memory (RAM), read-only memory (ROM), erasable programmable read-only memory (EPROM or flash memory), fiber optic, convenient compact disk read only memory (CD-ROM), optical storage device, magnetic storage device, or any suitable combination of the above.

The present disclosure also provides a computer program product, including a computer program which, when executed by a processor, carries out the multimedia data processing method as described above.

In the first aspect, according to one or more embodiments of the present disclosure, a multimedia data processing method is provided, and the multimedia data processing method is executable by a terminal device is performed, and the method comprising:
  detecting whether a shield instruction for multimedia data playing is received, wherein the shield instruction indicates that a shield processing is performed on multimedia data whose target parameter satisfies a preset condition.
  detecting the target parameter in the multimedia data to be played if the shield instruction is received, and performing the shield processing on the multimedia data to be played if the target parameter in the multimedia data to be played satisfies the preset condition.

According to one or more embodiments of the present disclosure, the detecting whether a shield instruction for multimedia data playing is received includes:
  acquiring and playing a first multimedia data.
  when it is detected that the target parameter included in the first multimedia data being played satisfies the preset condition, displaying a first prompt page on a display interface, where a shield control is included in the first prompt page.
  in response to a first touch operation acting on the shield control, determining the shield instruction for the set of multimedia data is received.

According to one or more embodiments of the present disclosure, the first prompt page covers and displays on the playing interface of the first multimedia data, and when the first prompt page is displayed, the first multimedia data continues to be played.

According to one or more embodiments of the present disclosure, the first prompt page also includes a skip control, the method further includes:
  in response to a second touch operation acting on the skip control, removing the first prompt page from the first multimedia data play interface and continuing to play the first multimedia data.

According to one or more embodiments of the present disclosure, a setup control is included on a display interface of the terminal device, the detecting whether a shield instruction for multimedia data playing is received includes:
  in response to a third touch operation acting on the setup control, jumping to a setup interface, where the setup interface includes a shield instruction option switch therein.
  in response to a turning-on operation acting on the shield instruction option switch, determining the shield instruction is received.

According to one or more embodiments of the present disclosure, the target parameter comprises a light flicker frequency.

According to one or more embodiments of the present disclosure, the performing the shielding process on the multimedia data to be played includes:
  generating a first shield mask layer;
  covering the play interface of the multimedia data to be played by the first shield mask layer.
  The method further includes:
  playing the multimedia data after shielding.

According to one or more embodiments of the present disclosure, after the playing the multimedia data after shielding, further includes:
  in response to a fourth touch operation acting on the first shield mask layer, jumping to the setup interface, wherein the setup interface includes the shield instruction option switch therein;
  in response to the close operation acting on the shield instruction option switch, turning off the shield function for multimedia data playing.

According to one or more embodiments of the present disclosure, the performing the shielding process on the multimedia data to be played includes:

deleting the multimedia data to be played.

According to one or more embodiments of the present disclosure, the detecting the target parameter in the multimedia data to be played includes:

detecting whether the target parameter in the multimedia data to be played satisfies the preset condition based on a parameter detection model.

According to one or more embodiments of the present disclosure, the detecting the target parameter in the multimedia data to be played includes:

detecting a first mark in the multimedia data, the first mark characterizing whether the target parameter satisfies the preset condition.

According to one or more embodiments of the present disclosure, the method also includes:

transmitting a request information carrying the shield instruction to a server so that the server detects whether the target parameters in target multimedia data to be transmitted satisfy the preset conditions, wherein when the target parameters in the target multimedia data satisfy the preset conditions, the server does not transmit the target multimedia data to the terminal device.

In the second aspect, according to one or more embodiments of the present disclosure, a multimedia data processing apparatus is provided, the multimedia data processing apparatus include:

a detection module, for detecting whether a shield instruction for multimedia data playing is received, wherein the shield instruction indicates that a shield processing is performed on multimedia data whose target parameter satisfies a preset condition.

a processing module, for detecting the target parameter in the multimedia data to be played if the shield instruction is received, and performing the shield processing on the multimedia data to be played if the target parameter in the multimedia data to be played satisfies the preset condition.

According to one or more embodiments of the present disclosure, the detection module is further used for:

acquiring and playing a first multimedia data.

when it is detected that the target parameter included in the first multimedia data being played satisfies the preset condition, displaying a first prompt page on a display interface, where a shield control is included in the first prompt page.

determining the shield instruction is received, in response to a first touch operation acting on the shield control.

According to one or more embodiments of the present disclosure, the first prompt page covers and displays on the playing interface of the first multimedia data, and when the first prompt page is displayed, the first multimedia data continues to be played.

According to one or more embodiments of the present disclosure, the first prompt page also includes a skip control, the processing module is also used for:

removing the first prompt page from the first multimedia data playing interface and continuing to play the first multimedia data, in response to a second touch operation acting on the skip control.

According to one or more embodiments of the present disclosure, a setup control is included on a display interface of the terminal device, the detection module is further used for:

in response to a third touch operation acting on the setup control, jumping to a setup interface, where the setup interface includes a shield instruction option switch therein.

in response to a turning-on operation acting on the shield instruction option switch, determining the shield instruction is received.

According to one or more embodiments of the present disclosure, the target parameter includes a light flicker frequency.

According to one or more embodiments of the present disclosure, the processing module is further used for:

generating a first shield mask layer;

covering the play interface of the multimedia data to be played by the first shield mask layer.

According to one or more embodiments of the present disclosure, the processing module is further used for:

playing the multimedia data after shielding.

According to one or more embodiments of the present disclosure, the processing module is further used for:

in response to a fourth touch operation acting on the first shield mask layer, jumping to the setup interface, wherein the setup interface includes the shield instruction option switch therein.

In response to a close operation acting on the shield instruction option switch, turning off the shield function for multimedia data playing.

According to one or more embodiments of the present disclosure, the processing module is further used for:

deleting the multimedia data to be played.

According to one or more embodiments of the present disclosure, the processing module is further used for:

detecting whether the target parameter in the multimedia data to be played satisfies the preset condition based on a parameter detection model.

According to one or more embodiments of the present disclosure, the processing module is further used for:

detecting a first mark in the multimedia data, the first mark characterizing whether the target parameter satisfies the preset condition.

According to one or more embodiments of the present disclosure, the processing module is further used for:

transmitting a request information carrying the shield instruction to a server so that the server detects whether the target parameters in target multimedia data to be transmitted satisfy the preset conditions, wherein when the target parameters in the target multimedia data satisfy the preset conditions, the server does not transmit the target multimedia data to the terminal device.

In a third aspect, according to one or more embodiments of the present disclosure, there provides an electronic device including: at least one processor and a memory;

the memory storing computer executable instructions, the at least one processor executing the computer executable instructions stored by the memory, causing the at least one processor to execute the multimedia data processing method in the first aspect as described above and a variety of possible designs from the first aspect.

In a fourth aspect, according to one or more embodiments of the present disclosure, there provides a computer readable storage media storing computer executable instructions therein, when executed by a processor, causing execution of the multimedia data processing method as described above in the first aspect and a variety of possible designs in the first aspect.

In a fifth aspect, according to one or more embodiments of the present disclosure, there provides a computer program product containing a computer program, when executed by a processor, causing execution of the multimedia data processing method as described above in the first aspect and a variety of possible designs in the first aspect.

The preferred embodiments of the present disclosure and the employed technical principle are described above. Those skilled in the art will appreciate that the disclosure range according to the present disclosure is not limited to a technical solution formed by specific combination of the technical features, and should also cover other technical solutions formed by arbitrary combination of the above technical features or equivalent features when not departing from the above concept. For example, a technical solution formed by exchanging the above features with the technical features disclosed in the present disclosure with similar function.

In addition, although respective operations are depicted in a particular order, it shall not be understood that these operations are required to be performed in a specific order or in sequential order. In a certain environment, multi-task and parallel processing may be advantageous. Likewise, although several specific implementations are included in the above discussion, these should not be construed as limiting the scope of the present disclosure. Some features described in the context of separate embodiments can also be combinedly implemented in a single embodiment. Conversely, various features described in the context of a single embodiment may be implemented in a plurality of embodiments separately or in any suitable sub-combination.

Although this topic has been described in a language specific to structural features and/or method logic actions, it shall be understood that the subject matter defined in the appended claims is not necessarily limited to the specific features or operations described above. In contrast, the specific features and operations described above are merely in exemplary forms for implementing the claims.

What is claimed is:

1. A multimedia data processing method executable by a terminal device, comprising:
    acquiring and playing a first multimedia data;
    when it is detected that a target parameter included in the first multimedia data being played satisfies a preset condition, displaying a first prompt page covering on a display interface, where a shield control is included in the first prompt page;
    in response to a first touch operation acting on the shield control, determining a shield instruction is received, wherein the shield instruction indicates that a shield processing is performed on multimedia data whose target parameter satisfies the preset condition;
    detecting the target parameter in the multimedia data to be played when the shield instruction is received, and performing the shield processing on the multimedia data to be played if the target parameter in the multimedia data to be played satisfies the preset condition,
    wherein the performing the shield processing on the multimedia data to be played comprises generating a first shield mask layer by which the play interface of the multimedia data to be played is covered.

2. The method of claim 1, wherein the first prompt page covers and displays on the playing interface of the first multimedia data, and when the first prompt page is displayed, the first multimedia data continues to be played.

3. The method of claim 1, wherein the first prompt page also includes a skip control, the method further includes:
    in response to a second touch operation acting on the skip control, removing the first prompt page from the first multimedia data play interface and continuing to play the first multimedia data.

4. The method of claim 1, wherein a setup control is included on a display interface of the terminal device, the method further includes detecting whether a shield instruction for multimedia data playing is received by:
    in response to a third touch operation acting on the setup control, jumping to a setup interface, where the setup interface includes a shield instruction option switch therein;
    in response to a turning-on operation acting on the shield instruction option switch, determining the shield instruction is received.

5. The method of claim 1, wherein the target parameter comprises a light flicker frequency.

6. The method of claim 1, wherein
    the method further includes:
    playing the multimedia data after shielding.

7. The method of claim 6, wherein, after the playing the multimedia data after shielding, the method further includes:
    in response to a fourth touch operation acting on the first shield mask layer, jumping to the setup interface, wherein the setup interface includes the shield instruction option switch therein;
    in response to the close operation acting on the shield instruction option switch, turning off the shield function for multimedia data playing.

8. The method of claim 1, wherein the performing the shielding process on the multimedia data to be played includes:
    deleting the multimedia data to be played.

9. The method of claim 1, wherein the detecting the target parameter in the multimedia data to be played includes:
    detecting whether the target parameter in the multimedia data to be played satisfies the preset condition based on a parameter detection model.

10. The method of claim 1, wherein the detecting the target parameter in the multimedia data to be played includes:
    detecting a first mark in the multimedia data, the first mark characterizing whether the target parameter satisfies the preset condition.

11. The method of claim 1, wherein the method also includes:
    transmitting a request information carrying the shield instruction to a server so that the server detects whether the target parameters in target multimedia data to be transmitted satisfy the preset conditions,
    wherein when the target parameters in the target multimedia data satisfy the preset conditions, the server does not transmit the target multimedia data to the terminal device.

12. An electronic device including: at least one processor and memory;
    the memory storing computer executable instructions,
    the at least one processor executing the computer executable instructions stored by the memory, causing the at least one processor to execute;
    acquiring and playing a first multimedia data;
    when it is detected that a target parameter included in the first multimedia data being played satisfies a preset condition, displaying a first prompt page covering on a display interface, where a shield control is included in the first prompt page;

in response to a first touch operation acting on the shield control, determining a shield instruction is received, wherein the shield instruction indicates that a shield processing is performed on multimedia data whose target parameter satisfies the preset condition;

detecting the target parameter in the multimedia data to be played when the shield instruction is received, and performing the shield processing on the multimedia data to be played if the target parameter in the multimedia data to be played satisfies the preset condition, wherein the performing the shield processing on the multimedia data to be played comprises generating a first shield mask layer by which the play interface of the multimedia data to be played is covered.

13. The electronic device of claim 12, wherein the first prompt page also includes a skip control, and wherein the at least one processor executing the computer executable instructions stored by the memory, causing the at least one processor to further execute:

in response to a second touch operation acting on the skip control, removing the first prompt page from the first multimedia data play interface and continuing to play the first multimedia data.

14. The electronic device of claim 12, wherein the performing the shielding process on the multimedia data to be played includes:

deleting the multimedia data to be played.

15. The electronic device of claim 12, wherein the detecting the target parameter in the multimedia data to be played includes:

detecting whether the target parameter in the multimedia data to be played satisfies the preset condition based on a parameter detection model, and/or detecting a first mark in the multimedia data, the first mark characterizing whether the target parameter satisfies the preset condition.

16. The electronic device of claim 12, wherein the at least one processor executing the computer executable instructions stored by the memory, causing the at least one processor to further execute:

transmitting a request information carrying the shield instruction to a server so that the server detects whether the target parameters in target multimedia data to be transmitted satisfy the preset conditions, wherein when the target parameters in the target multimedia data satisfy the preset conditions, the server does not transmit the target multimedia data to the terminal device.

17. A non-transitory computer readable storage medium storing computer executable instructions, wherein the computer executable instructions, when executed by at least one processor, cause the at least one processor to execute:

acquiring and playing a first multimedia data;

when it is detected that a target parameter included in the first multimedia data being played satisfies a preset condition, displaying a first prompt page covering on a display interface, where a shield control is included in the first prompt page;

in response to a first touch operation acting on the shield control, determining a shield instruction is received, wherein the shield instruction indicates that a shield processing is performed on multimedia data whose target parameter satisfies the preset condition;

detecting the target parameter in the multimedia data to be played when the shield instruction is received, and performing the shield processing on the multimedia data to be played if the target parameter in the multimedia data to be played satisfies the preset condition, wherein the performing the shield processing on the multimedia data to be played comprises generating a first shield mask layer by which the play interface of the multimedia data to be played is covered.

18. The non-transitory computer readable storage medium of claim 17, wherein the first prompt page also includes a skip control, and wherein the computer executable instructions, when executed by at least one processor, cause the at least one processor to further execute:

in response to a second touch operation acting on the skip control, removing the first prompt page from the first multimedia data play interface and continuing to play the first multimedia data.

19. The non-transitory computer readable storage medium of claim 17, wherein the performing the shielding process on the multimedia data to be played includes:

deleting the multimedia data to be played.

20. The non-transitory computer readable storage medium of claim 17, wherein the detecting the target parameter in the multimedia data to be played includes:

detecting whether the target parameter in the multimedia data to be played satisfies the preset condition based on a parameter detection model, and/or detecting a first mark in the multimedia data, the first mark characterizing whether the target parameter satisfies the preset condition.

* * * * *